United States Patent [19]
Morita

[11] Patent Number: 5,281,028
[45] Date of Patent: Jan. 25, 1994

[54] LINEAR MOTION ROLLING CONTACT GUIDE UNIT HAVING A DAMPER-INSERTED TRANSVERSE ADJUSTABLE MECHANISM

[75] Inventor: Kunihiko Morita, Tokyo, Japan
[73] Assignee: Nippon Thompson Co., Ltd., Japan
[21] Appl. No.: 932,423
[22] Filed: Aug. 19, 1992
[51] Int. Cl.$^5$ .............................................. F16C 29/06
[52] U.S. Cl. .......................................... 384/8; 384/45; 384/99
[58] Field of Search .................. 384/8, 45, 99, 12, 44, 384/43

[56] References Cited
U.S. PATENT DOCUMENTS

| | | | |
|---|---|---|---|
| 4,643,590 | 2/1987 | Olasz | 384/8 |
| 4,872,767 | 10/1989 | Knapp | 384/99 |
| 5,139,347 | 8/1992 | Hattori | 384/45 |
| 5,178,400 | 1/1993 | Singh | 384/99 |

Primary Examiner—Lenard A. Footland
Attorney, Agent, or Firm—Skjerven, Morrill, MacPherson, Franklin & Friel

[57] ABSTRACT

A linear motion rolling contact guide unit includes a rail, a slider assembly and a plurality of rolling members interposed between the rail and the slider assembly. The slider assembly includes a pair of lower and upper sub-assemblies. The lower sub-assembly is slidably mounted on the rail and the upper sub-assembly is mounted on the lower sub-assembly such that it may move transversely relative to the lower sub-assembly over a limited distance. A low friction intermediate member is provided at a first location in a gap between the opposed surfaces of the upper and lower sub-assemblies so as to provide an enhanced sliding characteristic therebetween. A squeeze film damper mechanism is provided at a second location in the gap between the upper and lower sub-assemblies for damping and/or absorbing undesired motion.

11 Claims, 5 Drawing Sheets

LINEAR MOTION ROLLING CONTACT GUIDE UNIT HAVING A DAMPER-INSERTED TRANSVERSE ADJUSTABLE MECHANISM

CROSS REFERENCE TO RELATED APPLICATIONS

The present application is related to the U.S. patent application, Ser. No. 07/717,446, filed Jun. 19, 1991, titled "TRANSVERSE ADJUSTABLE LM GUIDE UNIT", assigned to the assignee of this application and incorporated by reference hereto, also to U.S. patent application Ser. No. 07/932,824, attorney docket number AB-307-NS, filed concurrently herewith, titled "LINEAR MOTION ROLLING CONTACT GUIDE UNIT HAVING A DAMPER MECHANISM", by Kunihiko MORITA, which is assigned to the assignee of this application and incorporated by reference hereto.

BACKGROUND OF THE INVENTION

1. Field of the Invention

This invention generally relates to a linear motion guide unit suitable for use as a guide unit of various apparatuses such as high precision machining apparatuses and testing apparatuses, and, in particular, to such a linear motion rolling contact guide unit having a damper-inserted transverse adjustable mechanism for absorbing an error in alignment in the transverse direction.

2. Description of the Prior Art

A linear motion rolling contact guide unit is well known in the art and it generally includes a rail, a slider slidably mounted on the rail and a plurality of rolling members interposed between the rail and the slider so as to provide a relative rolling contact therebetween.

There are a number of different types of such a linear motion rolling contact guide unit. For example, in one type, a pair of inner guide grooves is formed on the opposite sides surfaces of the rail and the slider is generally U-shaped and formed with a pair of outer guide grooves each located opposite to an associated one of the inner guide grooves to thereby define a guide channel in which the rolling members are interposed between the rail and the slider. The slider is oriented upside down and slidably mounted on the rail in a straddling manner. With this structure, since there is basically provided no play between the rail and the slider in the lateral direction orthogonal to the longitudinal axis of the rail, the slider may move along the rail linearly at high accuracy.

The above-described type of linear motion rolling contact guide unit may not be suitable in some applications, in particular where it is desired that the slider be allowed to move in the lateral or transverse direction over some distance. One typical example of such a case is an application where two rails are provided in parallel and the sliders slidably mounted on these two rails are fixedly attached to a common table, as shown in FIG. 6.

In the structure shown in FIG. 6, a pair of elongated rails A and B are fixedly mounted on a base in parallel from each other. The rail A is generally rectangular in cross sectional shape and formed with a pair of inner guide grooves at its opposite side surfaces. A slider having a generally U-shaped cross section is slidably mounted on the rail A and formed with a pair of outer guide grooves each located in an opposed relationship with an associated one of the inner guide grooves to thereby define a guide channel. A plurality of rolling members are provided in the guide channel to provide a rolling contact between the rail A and its associated slider so that these rail A, slider and rolling members together define a linear motion rolling contact guide unit. Such a guide unit may be of the finite stroke type or the infinite stroke type. That is, the slider may be formed with a pair of endless circulating paths, each including a load path section, which corresponds to the above-mentioned guide channel, a return path section and a pair of curved connecting path sections each connecting the corresponding ends of the load and return path sections. With such an endless circulating path, theoretically an infinite relative motion may be provided between the rail and the slider. Without such an endless circulating path, the stroke of a relative motion between the rail and the slider is limited to a predetermined range.

A linear motion rolling contact table assembly shown in FIG. 5 also includes the other rail B which is arranged in parallel with the rail A. However, a tolerance is normally provided in the parallel arrangement between these two rails A and B from a practical viewpoint because there is a limit in the accuracy in arranging these two rails A and B in parallel. Because of such tolerance in the parallel arrangement between the two rails A and B, use can not be made of a linear motion rolling contact guide unit having the same structure as that having the rail A as described above. For this purpose, a linear motion rolling contact guide unit having the rail B has a structure different from that of the guide unit having the rail A.

That is, as shown in FIG. 6, the rail B has a generally T-shaped cross sectional shape because of the provision of a horizontally extending wing section C. The rail B is not provided with guide grooves as different from the rail A and instead it is formed with a flat guide surface E at its top surface. A slider D is slidably mounted on the rail B and it has a generally C-shaped cross sectional shape. The slider D is provided with four roller holders G and H, each including an endless circulating path provided with a plurality of rollers. Two of such roller holders G are in rolling contact with the top guide surface E of the rail B and the remaining two roller holders H are in rolling contact with bottom guide surfaces F of the wing sections C, respectively.

As described above, since the guide surfaces E and F are provided at the top and bottom surfaces of the wing sections C of the rail B, the slider D may shift in position in the lateral or transverse direction relative to the rail B as indicated by a double arrow I. As a result, if the range of such a relative motion in the lateral direction is selected to be slightly larger than the value of a tolerance set for the parallel arrangement between the two rails A and B, the common table fixedly attached to the two sliders associated with these rails A and B may move smoothly as guided by the rails A and B with a predetermined accuracy.

However, in the structure shown in FIG. 6, since a positive gap is provided between the rail B and the slider D, a problem arises when vibration is transmitted to the slider D externally, for example, from those elements mounted on the common table. Because of the presence of such a gap, a constant rattling motion may be produced in the slider D which in turn could cause wear, thereby deteriorating the performance. In addition, the presence of such a gap between the rail B and the slider D may cause an abrupt motion at the beginning of or ending of a relative motion between the rail B and the slider D. Thus, there is a tendency to deteriorate the accuracy in positioning of the slider D relative to the rail B.

With the structure shown in FIG. 6, in order to provide an accurate movement, the rolling contact between the rails A and B are their associated slider assemblies is preloaded or set with substantially zero tolerance. However, since there is a limit in arranging the rails A and B in parallel perfectly, there is normally an error in the degree of parallel arrangement. Thus, if the rails A and B extend over a relatively long distance, the true distance between the two rails A and B vary or fluctuate, so that the sliding resistance varies as the table assembly moves along the rails A and B. This is quite disadvantageous because of lack of smooth movement, possibility of excessive local wear and unreliability in operation. It is true that the problem could be relaxed if the rails A and B were aligned as accurately as possible. However, this would require an excessive care and skills in mounting the rails A and B on a common bed. For example, it would be almost impossible to arrange the rails A and B on the bed with an accuracy on the order of several tens of microns or less if the rails A and B are a few meters long.

SUMMARY OF THE INVENTION

In accordance with one embodiment of the present invention, there is provided a linear motion rolling contact guide unit, which generally includes a rail, a slider assembly, and a plurality of rolling members interposed between the rail and the slider assembly. The slider assembly has a two-part structure and typically the slider assembly includes a first sub-assembly and a second sub-assembly which may move relative to each other over a predetermined distance. Typically, the second sub-assembly is movably mounted on the first sub-assembly such that the second sub-assembly may move relative to the first sub-assembly transversely over a predetermined distance. Preferably, a sliding means is provided between the first and second sub-assemblies so as to allow the second sub-assembly to move relative to the first sub-assembly relatively easily. For example, the sliding means may be rolling members or a sheet having a low coefficient of friction. In the preferred embodiment, a pair of stopper members is provided in either of the first and second sub-assemblies so as to determine the stroke of relative movement between the first and second sub-assemblies.

In accordance with the critical feature of the present invention, a squeeze film damper mechanism is defined at least at a portion of a gap between the first and second sub-assemblies. Such a squeeze film damper mechanism is preferably defined by a gap having a predetermined distance, e.g., on the order of several tens of microns, between the first and second sub-assemblies and a quantity of liquid, such as oil, having a desired viscosity. The presence of such a squeeze film damper is advantageous because it serves to damp or absorb any vibration occurring in either or both of the first and second sub-assemblies. Besides, it is also advantageous since any abrupt relative movement between the first and second sub-assemblies can be eliminated, thereby insuring a smooth movement. Thus, a supply passage is provided in at least one of the first and second sub-assemblies so as to supply oil or the like to a location where such a squeeze film damper mechanism is to be provided.

It is therefore a primary object of the present invention to provide an improved linear motion rolling contact guide unit.

Another object of the present invention is to provide an linear motion rolling contact guide unit capable of damping and/or absorbing any undesired vibration.

A further object of the present invention is to provide a linear motion rolling contact guide unit capable of absorbing errors in alignment in the transverse direction.

A still further object of the present invention is to provide a linear motion rolling contact guide unit high in accuracy, compact in size, sturdy in structure and smooth in operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
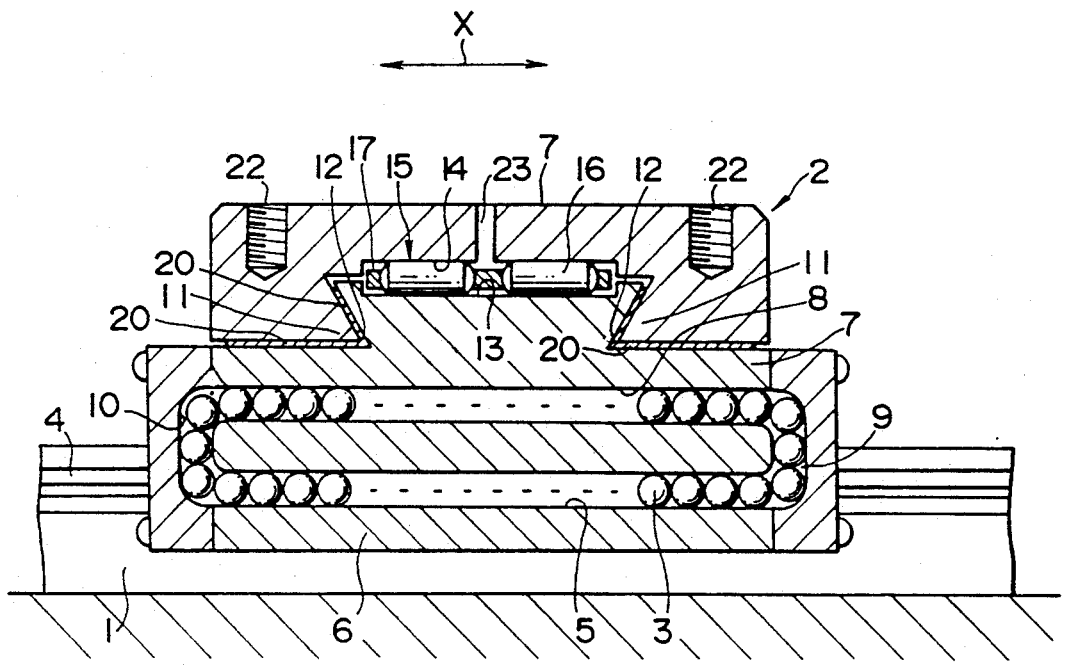
FIG. 1 is a schematic illustration showing in longitudinal cross section a linear motion rolling contact guide unit constructed in accordance with one embodiment of the present invention.
Figure 2:
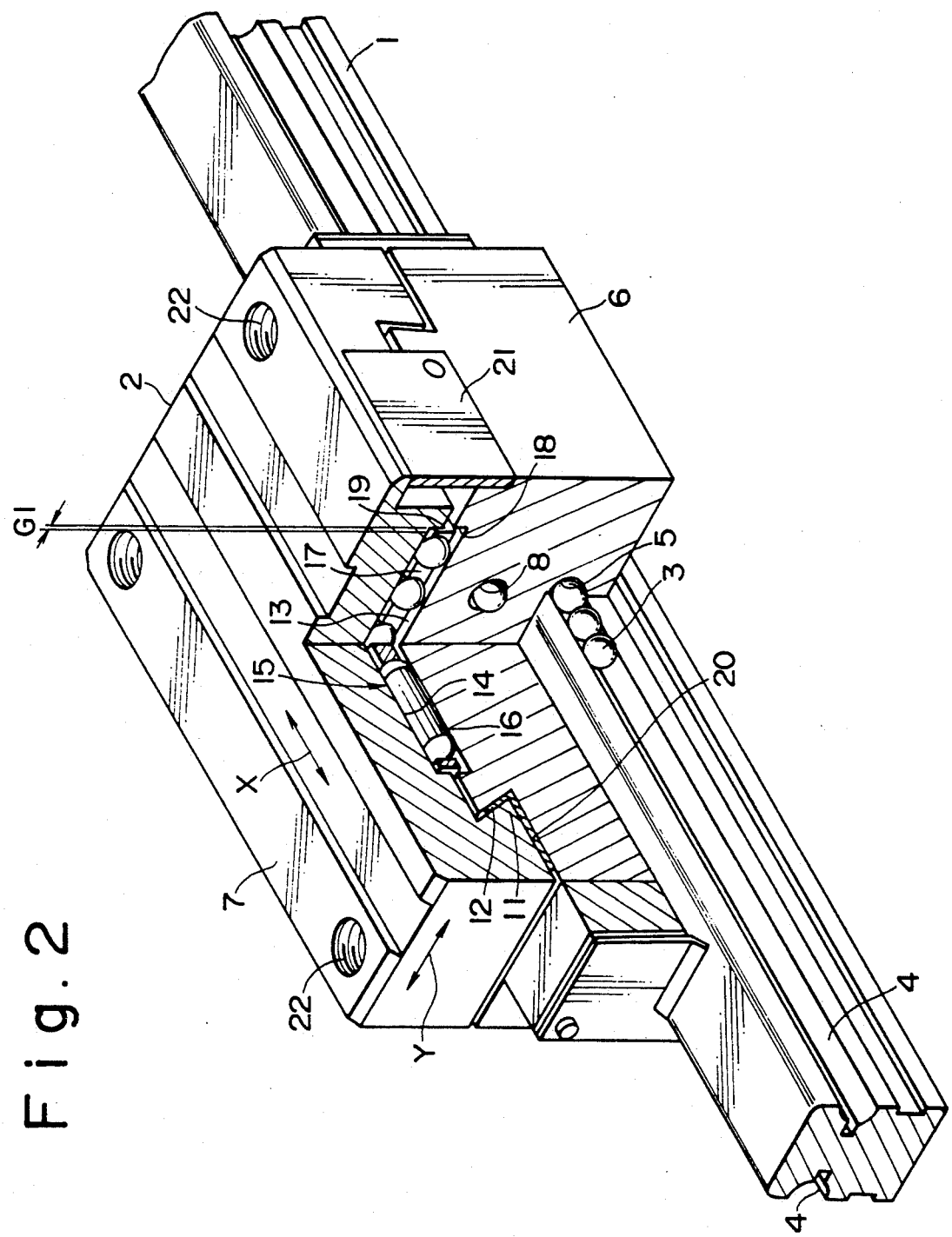
FIG. 2 is a schematic illustration showing with a part removed in perspective view the guide unit shown in FIG. 1.

Referring now to FIGS. 1 and 2, there is schematically shown a linear motion rolling contact guide unit constructed in accordance with one embodiment of the present invention. As shown, the present linear motion guide unit generally includes a rail 1, a slider assembly 2 and a plurality of rolling members or balls 3 in the illustrated embodiment. The rail 1 is generally rectangular in cross section and thus has a flat top and bottom surface and a pair of side surfaces each of which is formed with a guide groove 4. The rail 1 extends straight over a desired length, which may be relatively long in the present case, and the guide groove 4 extends in parallel with the longitudinal axis of the rail 1.

Figure 3:
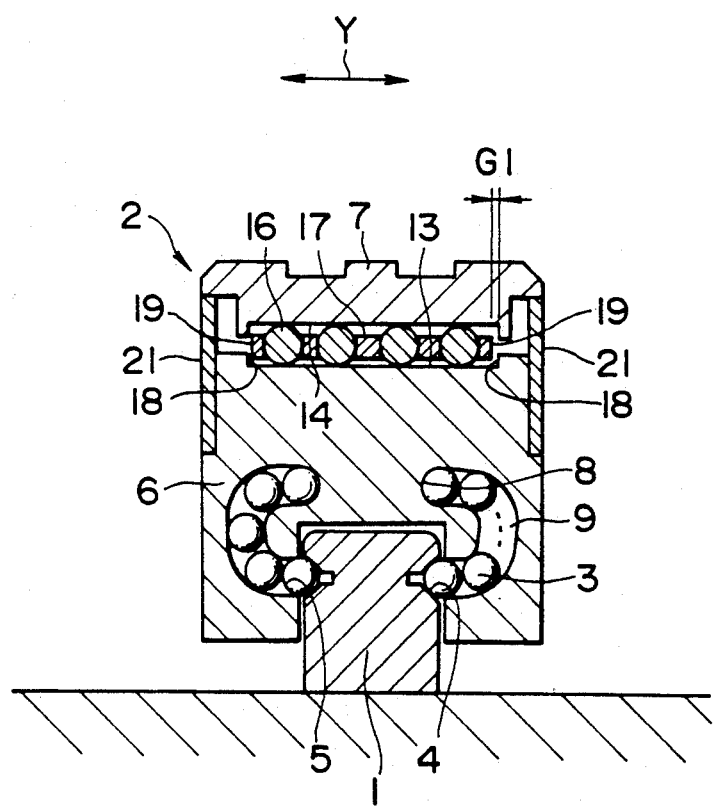
FIG. 3 is a schematic illustration showing in transverse cross section the guide unit shown in FIGS. 1 and 2.

The slider assembly 2 has a two-part structure, which includes a first sub-assembly and a second sub-assembly. In the illustrated embodiment, the slider assembly 2 has a lower sub-assembly 6 which corresponds to the first sub-assembly and an upper sub-assembly 7 which corresponds to the second sub-assembly. In the illustrated embodiment, the lower sub-assembly 6 is slidably mounted on the rail 1 such that the lower sub-assembly 6 and thus the slider assembly 22 as a whole can slidingly move along the rail 1 back and forth as indicated by a double arrow X. For this purpose, the lower sub-assembly 6 is formed with a pair of endless circulating paths as best shown in FIGS. 1 and 3. Each of the endless circulating paths includes a load path section 5, a return path section 8 and a pair of curved connecting path sections 9 and 10, each connecting the corresponding ends of the load and return path sections 5 and 8. A plurality of balls 3 as rolling members are provided in each of the endless circulating paths. The load path section 5 has an elongated window so that the balls 3 are partly exposed while locate at the load path section 5, and those corresponding guide groove 4 as best shown in FIG 3. Thus, a rolling contact is provided between the rail 1 and the lower sub-assembly 6 or slider assembly 2 as a whole. Since the balls 3 can roll along the endless circulating paths, the slider assembly by 2 may move along the rail 1 as long as the rail exists. The rolling contact between the rail 1 and the lower sub-assembly 6 through the balls 3 may be set at substantially zero tolerance or under pressure. For example, the balls 3 may be designed to be preloaded when assembled.

In accordance with the present invention, a dove tail guide projection 12 is formed at the top surface of the lower sub-assembly 6 extending in a transverse direction perpendicular to the longitudinal direction of the rail 1. The upper sub-assembly 7 is formed with a dove tail guide groove 11 which generally corresponds in shape to the dove tail guide projection 12 of the lower sub-assembly 6. A plurality of rolling members 15, or needle rollers 16 in the illustrated embodiment, are disposed between a bottom sliding surface 13 of the dove tail guide projection 12 and a top sliding surface 14 of the dove tail guide groove 14. The plurality of needle rollers 16 are maintained in a predetermined relative positional relation by a cage 17. Thus, the upper sub-assembly 6 in the transverse direction as indicated by a double arrow Y in FIG. 2.

In the illustrated embodiment, the bottom sliding surface 13 is formed as recessed at the top surface of the dove tail guide projection 12. And, the top sliding surface 14 is formed as recessed at the bottom surface of the dove tail guide groove 11. Accordingly, a gap G1 is defined between one side of either of recessed bottom or top sliding surface 13 or 14 and a corresponding edge of the cage 17 as best shown in FIG. 3. Thus, the range of transverse movement of the upper sub-assembly 7 relative to the lower sub-assembly 6 is limited by an engagement between the side of either of the recessed bottom or top sliding surface 13 or 14 and the corresponding edge of the cage 17. As a result, the range of relative movement between the lower and upper sub-assemblies 6 and 7 is rather limited and may be set at any desired value. In addition, use may be made of any other structure for limiting the range of transverse movement of the upper sub-assembly 7 relative to the lower sub-assembly 6.

In acordance with a critical feature of the present invention, a squeeze film damper 20 is defined between a pair of opposed sliding surfaces defined between the dove tail guide groove 11 and the dove tail guide projection 12. In the illustrated embodiment, such a squeeze film damper 20 is defined by providing a predetermined gap between the top opposed surfaces of the lower and upper sub-assemblies 6 and 7 and supplying a quantity of liquid, such as oil, having a desired viscosity to such a gap such that the liquid is maintained in the gap. The gap is preferably on the order of several tens of microns. In the embodiment shown in FIGS. 1 and 2, such a squeeze film damper 20 is provided in most of the gap between the lower and upper sub-assemblies 6 and 7 excepting the recessed bottom and top sliding surfaces 13 and 14.

The provision of such a squeeze film damper is particularly advantageous since it can serve to prevent any undesired vibration from being transmitted from either of the lower and upper sub-assemblies 6 and 7 to the other. Thus, any undesired vibration can be effectively absorbed or substantially damped by this damper 20. Besides, since this damper 20 establishes a fluid dynamic coupling between the lower and upper sub-assemblies 6 and 7, even if there is any play between these sub-assemblies 6 and 7, such a play would not deteriorate the performance of the present guide unit. More in detail, when the upper sub-assembly 7 starts to move or is brought to a halt relative to the lower sub-assembly 6, such a motion is insured to be smooth in operation and an abrupt change in motion can be avoided.

In the embodiment illustrated in FIG. 1, a supply passage 23 is provided in the upper sub-assembly 7 extending from its opening at its top surface to the gap between the recessed sliding surfaces 13 and 14. Thus, any desired liquid, such as oil, may be easily and, if desired, constantly supplied to a location where a squeeze film damper is to be defined through the supply passage 23.

A pair of stopper plates 21 is also fixedly mounted on both sides of the lower sub-assembly 6 for preventing the upper sub-assembly 7 from slipping away. The upper sub-assembly 7 is also provided with a plurality (four in this example) of threaded holes 22 for use in having a desired object mounted on the top surface of the upper sub-assembly 7.

Figure 6:
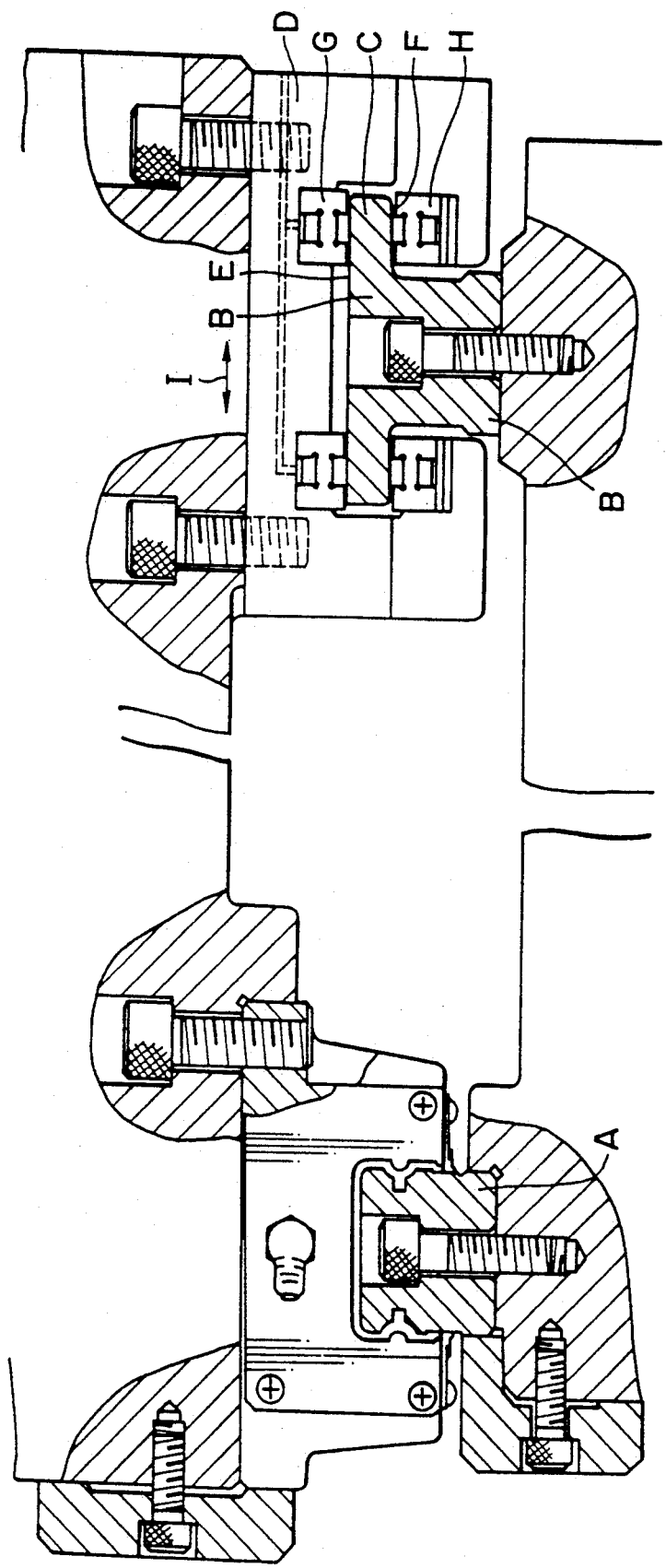
FIG. 6 is a schematic illustration showing partly in cross section a typical prior art linear motion rolling contact table assembly suitable for use in heavy duty applications.

In one example, the present linear motion guide unit having the above-described structure may be used for the guide units which are associated with the rail B shown in FIG. 6. In this structure, those guide units which are associated with the other rail A may be conventional in structure. With this arrangement, even if there is an error in parallel alignment between the two rails A and B, such an error can be suitably absorbed by the present linear motion guide units associated with the rail B. Since the linear motion guide unit described with reference to FIGS. 1 through 3 is similar in structure to the conventional linear motion guide unit excepting the additional provision of its transversely movable upper sub-assembly, the present linear motion guide unit can be constructed by slightly modifying the conventional linear motion guide unit.

Figure 4:
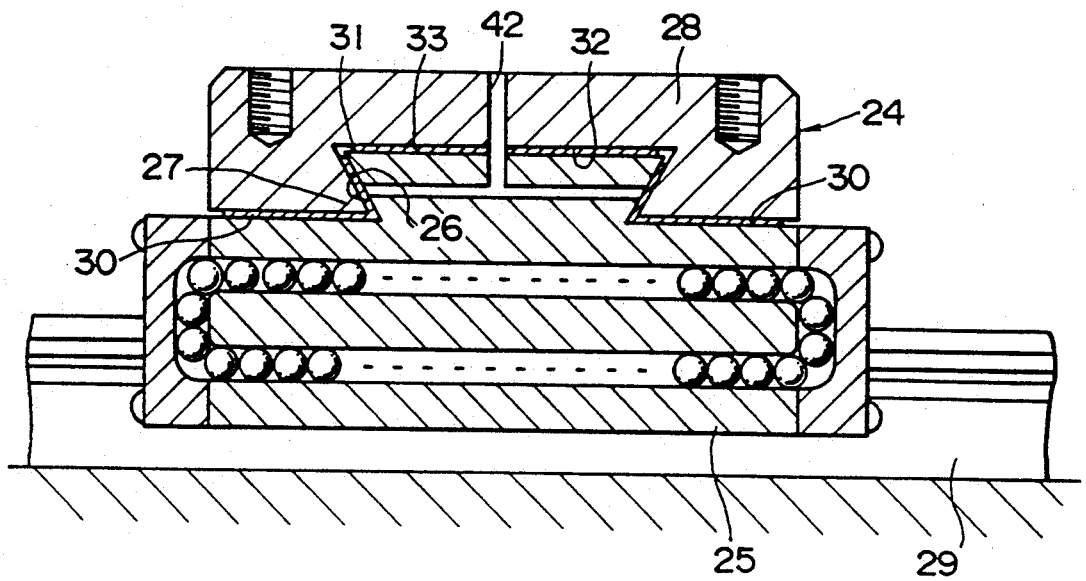
FIG. 4 is a schematic illustration showing in longitudinal cross section a linear motion rolling contact guide unit constructed in accordance with another embodiment of the present invention.
Figure 5:
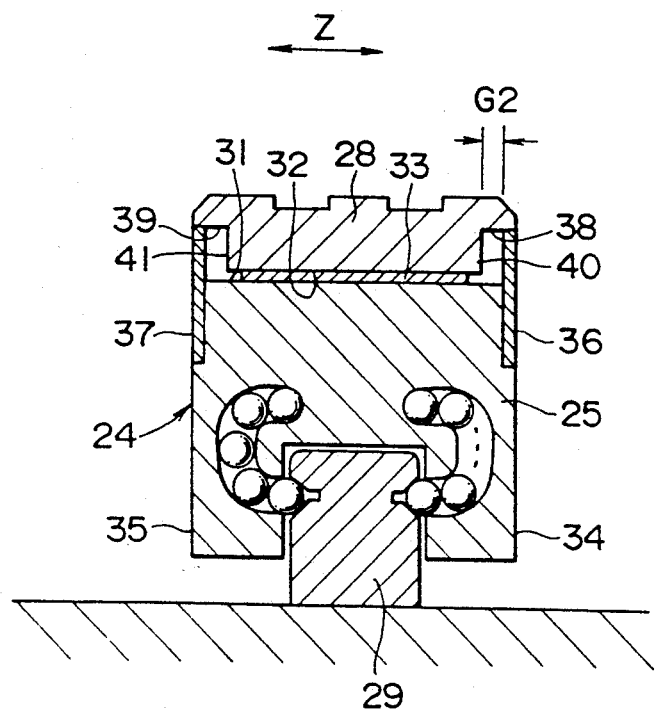
FIG. 5 is a schematic illustration showing in transverse cross section the guide unit shown in FIG. 4.

FIGS. 4 and 5 illustrate another embodiment of the present invention, which is similar in many respects to the above-described embodiment. That is, the linear motion guide unit of the present embodiment generally includes a rail 29, a slider assembly 24 and a plurality of rolling members 3 or balls in this embodiment. The rail 29 is substantially identical in structure to the rail 1 of the above-described embodiment. The slider assembly 24 of the present embodiment also has a two-part structure which includes a first sub-assembly and a second sub-assembly movable relative to each other in a predetermined direction. In the present embodiment, the slider assembly 24 includes a lower sub-assembly 25 and an upper sub-assembly 28 which is movable relative to the lower sub-assembly 25 in the direction transverse to the longitudinal axis of the rail 29. As easily understood when comparing FIG. 4 with FIG. 1, the lower sub-assembly 25 of the present embodiment is very similar in structure to the lower sub-assembly 6 of the previous embodiment excepting the fact that a recessed sliding surface is not provided at the top surface of a dove tail guide projection 26. Besides, the upper sub-assembly 28 of the present embodiment is very similar in structure to the upper sub-assembly 7 of the previous embodiment excepting the fact that a recessed sliding surface is not provided at the bottom surface of a dove tail guide groove 30.

In the present embodiment, a flat surface 31 is provided at the top surface of the dove tail guide projection 26 and an opposite flat surface 32 is provided at the bottom surface of the dove tail guide groove 27. And, a lubricating sheet 33 of a material having a low coefficient of friction, such as a silicone family synthetic resin, is provided between the opposite flat surfaces 31 and 32 of the dove tail guide projection 26 and groove 30. As a result, the upper sub-assembly 28 may move in the transverse direction relative to the lower sub-assembly 25 with a low friction therebetween.

In accordance with a critical feature of the present invention, a squeeze film damper mechanism 30 is provided in a gap defined between the opposed surfaces of the lower and upper sub-assemblies 25 and 28 at a location other than the location where the low friction sheet 33 is provided. In the present embodiment, such a squeeze film damper mechanism 0 is provided in a lower horizontal gap and also in a pair of inclined gap defined between the lower and upper sub-assemblies 25 and 28. Preferably, such a squeeze film damper 30 has a structure identical to that 20 described with reference to the first embodiment shown in FIGS. 1–3. Thus, a relative movement between the lower and upper sub-assemblies 25 and 28 is extremely smooth without any undesired abrupt motion and undesired vibration is effectively damped or absorbed.

As shown in FIG. 4, a supply passage 42 is provided in the slider assembly 24 and it extends from an opening at the top surface of the upper sub-assembly 28 into the lower sub-assembly 25 and to a discharging port which is opened into the inclined gap defined between the lower and upper sub-assemblies 25 and 28. Thus, a quantity of liquid, such as oil, having a desired viscosity may be supplied to an intended location where such a squeeze film damper 30 is to be defined through such a passage 42.

A pair of stopper plates 36 and 37 is fixedly attached to the lower sub-assembly 25 at its side surfaces 34 and 35, respectively, for preventing the upper sub-assembly 28 from slipping away when it moves in the transverse direction relative to the lower sub-assembly 25. On the other hand, the upper sub-assembly 28 is formed with a pair of side recesses 38 and 29 for receiving therein the upper portions of the stopper plates 36 and 37, respectively. Thus, the transverse movement of the upper sub-assembly 28 is limited by an engagement between one of the stopper plates 36 and 37 and its corresponding side surface of the upper sub-assembly 28 defined in its corresponding side recess 38 or 39. As a result, a gap G2 is defined between one of the stopper plates 36 and 37 and the corresponding side surface of the upper sub-assembly 28 defined in the corresponding recessed side determines the maximum stroke of the upper sub-assembly 28 in the transverse direction Z. In this embodiment, therefore, the stopper plates 36 and 37 serve not only to prevent the upper sub-assembly 28 from slipping away but also to determine the stroke of the upper sub-assembly 28 relative to the lower sub-assembly 25 in the transverse direction.

The above-described second embodiment may be applied to a heavy duty linear motion guide unit assembly shown in FIG. 6 in the same manner as described with respect to the first embodiment, if desired. It should be noted, however, that use has been made of needle rollers and a lubricating sheet of low friction material as sliding means between the first (upper) and second (lower) sub-assemblies in the above-described embodiments, use may also be made of any other suitable materials and means, such as cylindrical rollers, balls a film of low friction material and cam followers.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact guide unit, comprising:
   a rail extending over a length;
   a slider assembly slidably mounted on said rail, said slider assembly including a first sub-assembly, a second sub-assembly mounted on said first sub-assembly movably relative to said first sub-assembly in a predetermined direction, a low friction intermediate means interposed at a first location between said first and second sub-assemblies, and a squeeze film damper mechanism interposed at a second location, different from said first location, between said first and second sub-assemblies; and
   a plurality of rolling members interposed between said rail and said first sub-assembly such that said slider assembly may move along said rail.

2. The unit of claim 1, wherein said predetermined direction is a transverse direction with respect to the longitudinal axis of said rail.

3. The unit of claim 2, wherein said rail is formed with a pair of guide grooves at its opposite side surfaces and said first sub-assembly is formed with a pair of endless circulating paths in which said plurality of rolling members are provided, each of said endless circulating paths including a load path section, a return path section and a pair of curved connecting path sections each connecting the corresponding ends of said load and return path sections, whereby said load path section is provided with an elongated window through which those rolling members located in said load path section are partly exposed to be received in the corresponding guide groove of said rail.

4. The unit of claim 2, wherein said low friction intermediate means includes a plurality of rollers interposed between said first and second sub-assemblies.

5. The unit of claim 2, wherein said low friction intermediate means includes a lubricating sheet of a low friction material.

6. The unit of claim 2, further comprising limiting means for limiting a relative movement between said first and second sub-assemblies in said predetermined direction to a predetermined amount.

7. The unit of claim 6, wherein said limiting means also serve to prevent the first sub-assembly from slipping away from said first sub-assembly.

8. The unit of claim 6, further comprising means for preventing said first sub-assembly from slipping away from sid first sub-assembly.

9. The unit of claim 1, wherein said squeeze film damper mechanism includes a gap defined at said second location between a pair of opposed surfaces of said first and second sub-assemblies and a quantity of fluid having a predetermined viscosity.

10. The unit of claim 9, wherein said fluid is oil.

11. The unit of claim 1, wherein said slider assembly is provided with a flow passage extending from an inlet opening formed in a surface of said slider assembly to said second location.

* * * * *

UNITED STATES PATENT AND TRADEMARK OFFICE
CERTIFICATE OF CORRECTION

PATENT NO.    :  5,281,028
DATED         :  Jan. 25, 1994
INVENTOR(S)   :  Kunihiko Morita It is certified that error appears in the above-identified patent and that said Letters Patent is hereby corrected as shown below:

On the title page: item

[22] Filed: August 1, 1992"

[30] Foreign Application Priority Data

Aug. 23, 1991 [JP]    Japan...........3-237256

Signed and Sealed this

Sixth Day of September, 1994

Attest:

BRUCE LEHMAN

Attesting Officer    Commissioner of Patents and Trademarks